(12) United States Patent
Shimomura et al.

(10) Patent No.: US 7,188,401 B2
(45) Date of Patent: Mar. 13, 2007

(54) MOTOR CASE

(75) Inventors: Shigeyuki Shimomura, Tama (JP); Takanori Sakamoto, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 11/379,695

(22) Filed: Apr. 21, 2006

(65) Prior Publication Data

US 2006/0186748 A1    Aug. 24, 2006

(51) Int. Cl.
*H02K 5/04* (2006.01)

(52) U.S. Cl. .............. 29/521; 310/42; 310/40 MM; 310/89

(58) Field of Classification Search .......... 310/42, 310/49 R, 40 MM, 89, 257; 29/521
See application file for complete search history.

(56) References Cited

U.S. PATENT DOCUMENTS 5,412,267 A    5/1995   Okada et al.
6,191,516 B1   2/2001   Froehlich et al.
6,594,882 B1   7/2003   Tanida et al.
2002/0005670 A1 1/2002  Takagi et al. .......... 310/49 R

FOREIGN PATENT DOCUMENTS

JP    2002-238199    8/2002

*Primary Examiner*—Darren Schuberg
*Assistant Examiner*—David W. Scheuermann
(74) *Attorney, Agent, or Firm*—Whitman, Curtis, Christofferson & Cook, PC

(57) ABSTRACT

In a motor case 1, recesses 8 are formed in inner surfaces of upper and bottom surface portions 2 and 3 (which are spaced from each other by a distance smaller than the distance between left and right side surface portions 4 and 5), thus reducing the thickness of these surface portions 2 and 3, thereby increasing a space for receiving a stator coil 10 as much as possible. Unlike a construction in which a stator coil is exposed through openings formed in a motor case, the stator coil is covered with the motor case, and therefore the motor is excellent in shielding performance and impact resistance. The motor case 1 has a square tubular shape, and can be formed by blanking, press-forging (for the purpose of forming the recesses) and bending a metal sheet, and the motor case can be produced at a low cost.

12 Claims, 4 Drawing Sheets

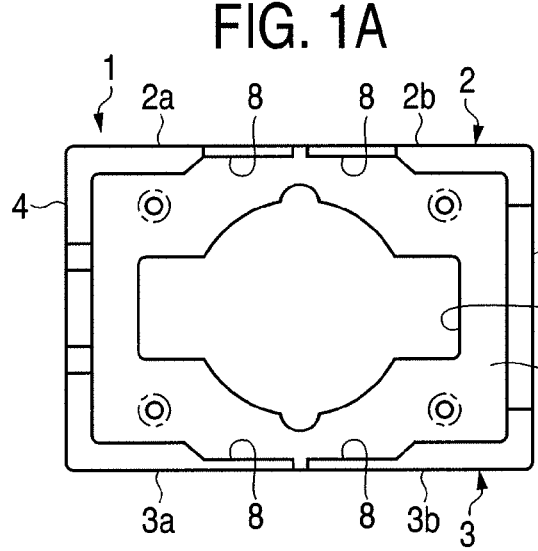
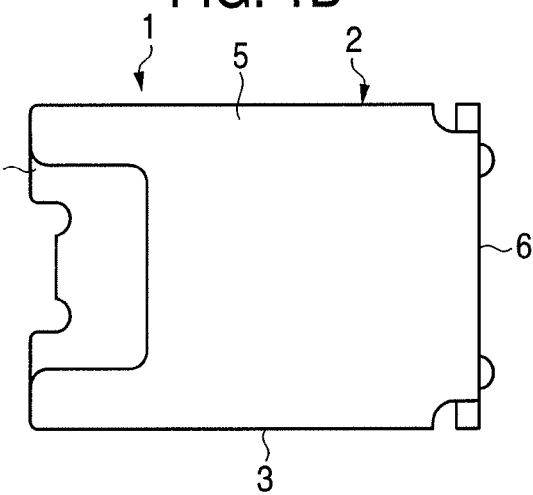
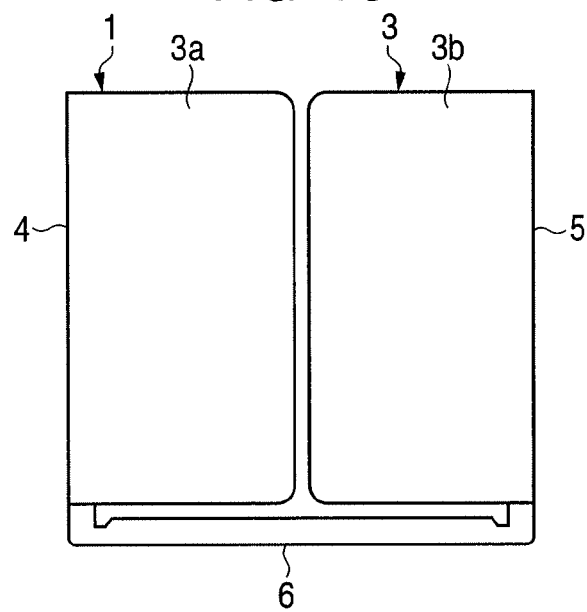

FIG. 2
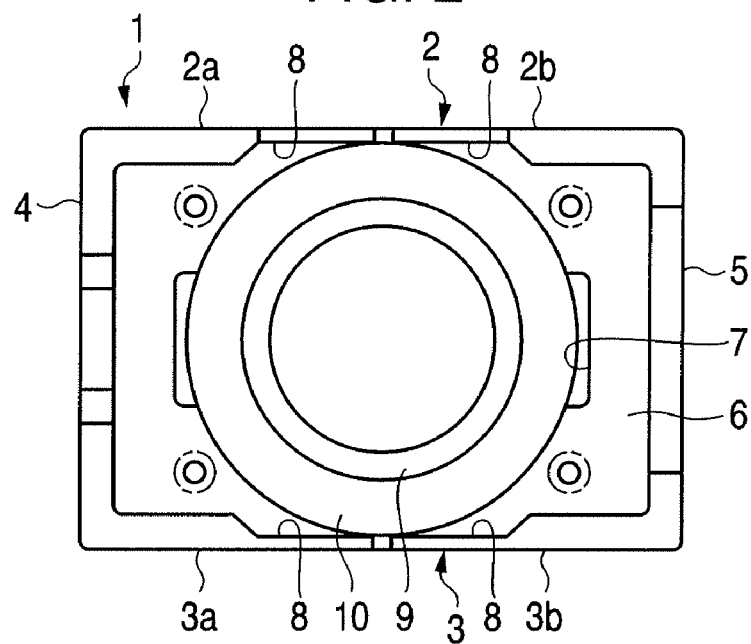
FIG. 3A  FIG. 3B
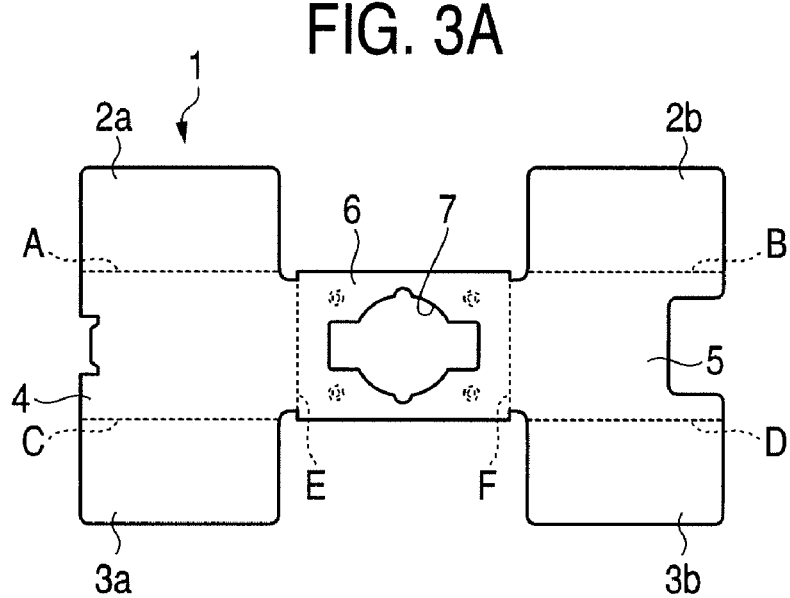

MOTOR CASE

BACKGROUND OF THE INVENTION

1. Field of the Invention

This invention relates to a motor case, and more particularly to a motor case whose outer size is reduced as much as possible.

2. Description of the Related Art

As one example of techniques of reducing the outer size of a motor (such as a stepping motor) as much as possible, there is known a construction in which notches are formed respectively in side wall portions of a motor case to provide openings, and the outer peripheral surfaces of coils of a stator are exposed to these openings (JP-A-2002-238199).

Usually, an air gap is formed between an outer peripheral surface of a coil and an inner surface of a motor case so that the coil will not contact the motor case, and therefore the width or outer size of the motor case is equal to the sum of the coil diameter, the air gap and the wall thickness of the motor case.

On the other hand, in the motor of JP-A-2002-238199, the distance between the parallel side wall portions (flat surface portions) of the motor case of a generally oval shape (as seen from the front side thereof) is equal to or slightly smaller than the diameter of the coil, and also the side wall portions are notched to provide the openings, and the outer peripheral surface of the stator coil is exposed to these openings. With this construction, the motor width is reduced into a dimension generally equal to the coil diameter.

In the motor disclosed in JP-A-2002-238199, the parallel side wall portions of the motor case are notches to provide the openings, and the outer peripheral surface of the stator coil is exposed to these openings, and with this construction the motor width is reduced. However, the coil is exposed to the openings in the motor case, and therefore a space must be provide around the motor so that a frame, a chassis or other electronic parts of an electronic equipment will not contact the coil, and this invites a problem that an advantage, achieved by this compact design, is reduced.

Therefore, there arises the technical problem to be solved in order to reduce the size of the motor case as much as possible and also to achieve the high-density mounting of the parts while eliminating a fear that the coil contacts the frame and electronic parts.

SUMMARY OF THE INVENTION

This invention has been proposed to achieve the above object, and according to the invention, there is provided a motor case for receiving a stator coil and a rotor wherein opposed upper and lower surface portions or opposed left and right surface portions of the motor case are flat and parallel to each other, characterized in that a recess is formed in an inner surface of each of the opposed flat surface portions so as to prevent the opposed flat surface portions from interfering with the stator coil, thus reducing the thickness of part or the whole of each of the opposed flat surface portions, thereby increasing a space for receiving the stator coil.

With this construction, the outer size of the motor case can be made smaller as compared with the conventional motor case.

In the motor case, a metal sheet is blanked into a shape corresponding to a developed shape of the motor case, and subsequently the recesses are formed in the metal sheet by press-forging, cutting or the like, and subsequently the metal sheet is formed into the shape of the motor case by bending or drawing.

In a developed form of the motor case, each of the opposed flat surface portions, having the recess, is divided into two sections along a centerline in an axial direction, and the two sections jointly form one continuous flat surface portion by bending or drawing the metal sheet.

With this method, the recesses can be easily formed respectively in the inner surfaces of the flat surface portions and particularly in central portions of these inner surfaces.

The motor case has a square tubular shape, and has flat opposed side surface portions interconnecting the opposed upper and lower surface portions or the opposed left and right surface portions.

With this configuration, the motor case can be produced by a bending operation without the need for a drawing operation.

The recesses are formed respectively in the inner surfaces of the opposed flat surface portions of the motor case so as to prevent these opposed flat surface portions from interfering with the stator coil, thus reducing the thickness of these opposed flat surface portions. As a result, the stator coil-receiving space is increased, and the stator coil, having a larger diameter than that of a stator coil received within the conventional motor case, can be received within the motor case, and the size-to-performance ratio of the motor is enhanced.

The motor case is formed into a square tubular shape such that the side surface portions of the motor case other than the opposed flat surface portions are also flat, and with this construction the motor case can be produced by blanking and bending the metal sheet, and the production cost can be reduced.

BRIEF DESCRIPTION OF THE DRAWINGS

FIGS. 1A to 1C show one preferred embodiment of a motor case of the present invention, and FIG. 1A is a front-elevational view thereof, FIG. 1B is a side-elevational view thereof, and FIG. 1C is a bottom view thereof.

FIG. 2 is a front-elevational view showing a condition in which a stator coil is inserted in the motor case of FIG. 1.

FIGS. 3A and 3B show a developed configuration of the motor case, and FIG. 3A is a plan view showing a blanked metal sheet, and FIG. 3B is a side-elevational view thereof.

FIG. 4A is a plan view showing the metal sheet subjected to a thickness reduction processing, and FIG. 3B is a side-elevational view thereof.

DESCRIPTION OF THE PREFERRED EMBODIMENTS

Figure 4A:
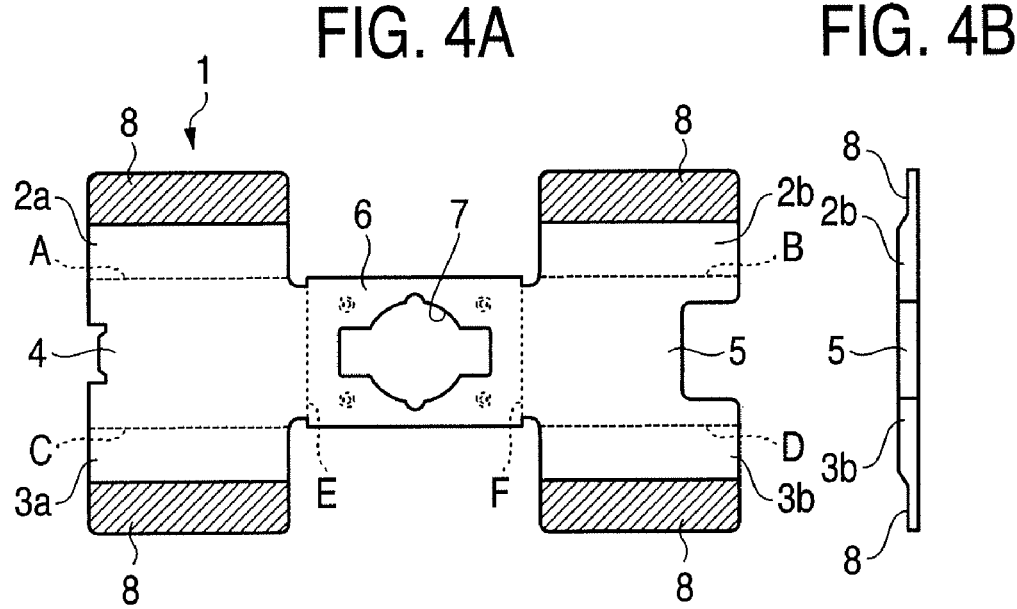
FIGS. 4A and 4B show the developed configuration of the motor case.

In a motor case of the present invention, recesses are formed respectively in inner surfaces of opposed flat surface portions of the motor case so as to prevent these opposed flat surface portions from interfering with a stator coil, thus reducing the thickness of these opposed flat surface portions, thereby increasing a stator coil-receiving space. With this construction, there is achieved the object that the size of the motor case is reduced as much as possible without exposing the stator coil.

(First Embodiment)

Here, a motor case of a small-size stepping motor will be described by way of example. FIG. 1 shows the motor case 1, and is of a square tubular shape having an upper surface portion 2, a bottom surface portion 3, left and right side surface portions 4 and 5 and a rear surface portion 6, these surface portions being flat or planar. A stator coil, a rotor and a rotor bearing (which are not shown) are received within the motor case. The rotor bearing is engaged in a hole 7 formed through the rear surface portion, and is properly positioned. A front cover (not shown), having external connection terminals and a rotor bearing, is attached to a front open side of the motor case.

The motor case 1 is made of an iron sheet, and is formed by blanking and pressing, and an iron sheet, having a thickness of about 0.4 mm, is used as in a commonly-used small-size motor. The distance between the upper surface portion 2 and the bottom surface portion 3 is smaller than the distance between the left and right side surface portions 4 and 5 as shown in FIG. 1A, and therefore the maximum diameter of the stator coil which can be received in the motor case is determined by the distance between the upper surface portion 2 and the bottom surface portion 3. Recesses 8 and 8 are formed respectively in inner surfaces of left and right portions of a central portion of each of the upper surface portion 2 and the bottom surface portion 3, thereby reducing these central left and right portions into a thickness of about 0.1 mm. The distance between the upper surface portion 2 and the bottom surface portion 3 is about 0.6 mm larger as compared with the case where such wall thickness reduction processing is not effected.

FIG. 2 shows a condition in which the stator coil 10, wound on a bobbin 9, is inserted in the motor case 1. The distance between the upper surface portion 2 and the bottom surface portion 3 is larger as compared with the conventional type, and therefore the coil of a larger diameter (that is, having a larger number of turns of the coil), increased by an amount corresponding to the amount of increase of this distance, can be received within the motor case, so that the stepping motor can be formed into a large-torque design. And besides, when a large-torque design is not required, the reduction of power consumption and generated heat due to the decrease of a DC resistance can be expected by the use of a wire of a larger diameter. In other words, when the coil, having the same diameter as that of a coil used in the conventional motor, is used, the height (or the overall width, depending on the direction of mounting of the motor) can be reduced.

In the production of a motor case, it is common to form the motor case into a tubular shape by drawing. However, it is more efficient to produce a motor case by sheet metal working as described below, and besides the cost is lower.

Figure 4B:
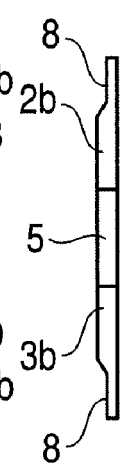

FIG. 3 is a developed view of the motor case 1 having the five faces (or surfaces), and the left and right side surface portions 4 and 5 extend continuously respectively from left and right side edges of the centrally-disposed rear surface portion 6, and half (½) upper surface portions 2a and 2b extend upwardly continuously from upper edges of the left and right side surface portions 4 and 5, respectively, while half (½) bottom surface portions 3a and 3b extend downwardly continuously from lower edges of the left and right side surface portions 4 and 5, respectively. Namely, the upper surface portion 2 is divided into the two half upper surface portions 2a and 2b at the central portion of the motor case 1, while the bottom surface portion 3 is divided into the two half bottom surface portions 3a and 3b at the central portion of the motor case 1. After the metal sheet is blanked into this shape, upper half portions of the two half upper surface portions 2a and 2b (at which the recesses 8 are to be formed, respectively), indicated by hatching in FIG. 4, are press-forged to be reduced in thickness, and also lower half portions of the two half bottom surface portions 3a and 3b (at which the recesses 8 are to be formed, respectively), indicated by hatching in FIG. 4, are press-forged to be reduced in thickness. At this time, burrs are formed at the recess portions 8 formed as a result of the thickness reduction processing, and therefore these burrs are cut off, thereby correcting the metal sheet into the shape shown in FIG. 4. Then, the metal sheet is bent at right angles at folding lines A, B, C, D, E and F indicated in broken lines in FIG. 4. As a result, the half upper surface portions 2a and 2b jointly form the continuous flat surface portion 2, while the half bottom surface portions 3a and 3b jointly form the continuous flat surface portion 3, thereby forming the motor case 1 of a square tubular shape as shown in FIG. 1. The thickness reduction processing means is not particularly limited to the press-forging, but any other suitable processing such as cutting or grinding can be used.

(Second Embodiment)

Figure 5:
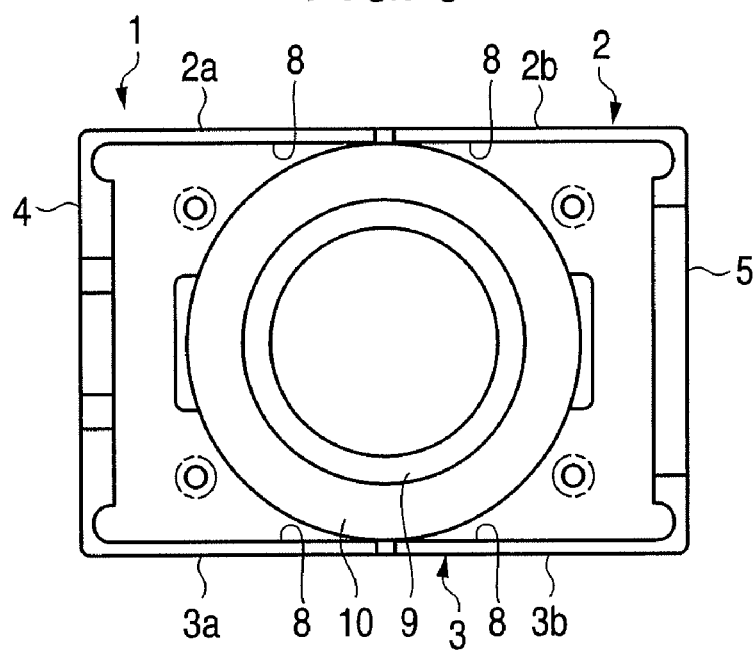
FIG. 5 is a front-elevational view of another embodiment of a motor case of the invention.

In the first embodiment, only those portions of the motor case which are necessary for increasing the diameter of the stator coil which can be received within the motor case are reduced in thickness. However, each of an upper surface portion 2 and a bottom surface portion 3 can be reduced in thickness over an entire area thereof to provide recesses 8 as shown in FIG. 5. In this case, the strength of a motor case is lower as compared with the motor case of FIG. 1, and one of the two configurations can be suitably selected in accordance with the dimensional specification of the motor case and the degree of difficulty of the processing.

(Third Embodiment)

Figure 6A:
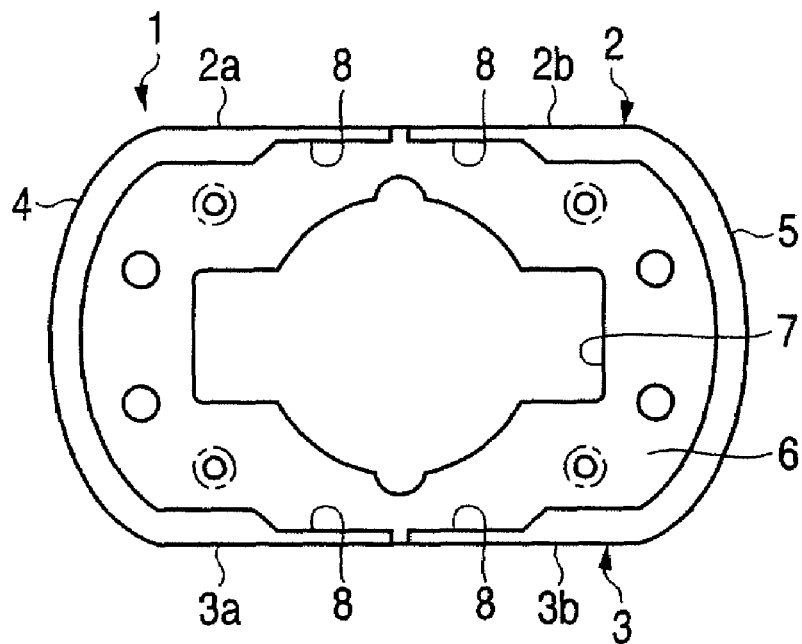
FIGS. 6A and 6B are a front-elevational view and a bottom view of a further embodiment of a motor case of the invention, respectively.
Figure 6B:
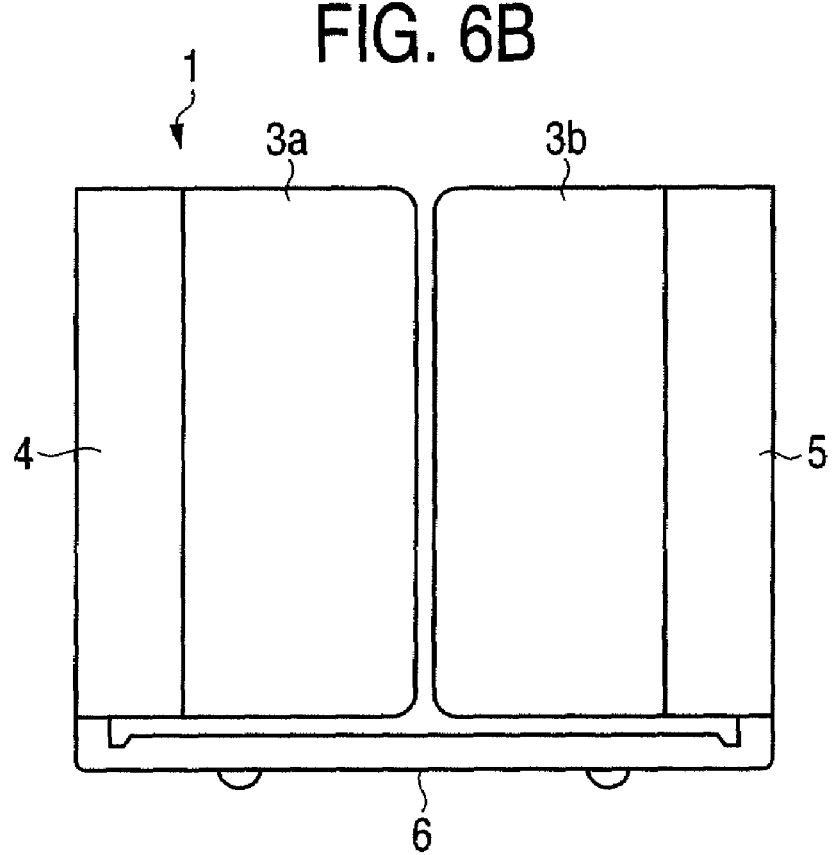

Although the motor cases 1 of the first and second embodiments have the square tubular shape, a motor case 1 of FIG. 6 has a generally oval shape, in which case a metal sheet is bent at folding lines A, B, C and D, and also each of left and right side surface portions 4 and 5 is formed into a curved shape by drawing.

The present invention is not limited to the above embodiments, and various modifications can be made within the technical scope of the invention, and it will be readily appreciated that such modifications naturally fall within the scope of the invention.

What is claimed is:

1. A method of manufacturing a motor case, comprising:
   blanking a metal sheet so as to comprise:
   a first section;
   a second section and a third section, each of which is continued from the first section;
   a fourth section, continued from the second section and having a first edge;
   a fifth section, continued from the second section and having a second edge;
   a sixth section, continued from the third section and having a third edge; and
   a seventh section, continued from the third section and having a fourth edge;
   thinning at least a part of the fourth section including the first edge to form a first thinned part;

thinning at least a part of the sixth section including the third edge to form a second thinned part;

bending the second section and the third section so as to define a space adapted to accommodate a stator coil of a motor therebetween;

bending the fourth section and the six section such that the first edge and the third edge are opposed to each other, and the first thinned part and the second thinned part face the space; and bending the fifth section and the seventh section such that the second edge and the fourth edge are opposed to each other, wherein the fourth section and the six section are kept flat after the bending.

2. The manufacturing method as set forth in claim 1, further comprising:

thinning at least a part of the fifth section including the second edge to form a third thinned part;

thinning at least a part of the seventh section including the fourth edge to form a fourth thinned part, wherein:

the fifth section and the seventh section are bent such that the third thinned part and the fourth thinned part face the space; and wherein the fifth section and the seventh section are kept flat after the bending.

3. The manufacturing method as set forth in claim 1, wherein the first thinned part and the second thinned part are adapted to come in contact with the motor.

4. The manufacturing method as set forth in claim 2, wherein the third thinned part and the fourth thinned part are adapted to come in contact with a part of the stator coil of the motor.

5. The manufacturing method as set forth in claim 1, wherein:

the first edge and the third edge are opposed to each other without engagement; and the second edge and the fourth edge are opposed to each other without engagement.

6. The manufacturing method as set forth in claim 5, wherein:

the first edge and the third edge are opposed to each other while defining a gap therebetween; and the second edge and the fourth edge are opposed to each other while defining a gap therebetween.

7. The manufacturing method as set forth in claim 1, wherein the first thinned part and the second thinned part are formed by press-forging.

8. The manufacturing method as set forth in claim 1, wherein the first thinned part and the second thinned part are formed by cutting.

9. The manufacturing method as set forth in claim 1, wherein the first thinned part and the second thinned part are formed by grinding.

10. The manufacturing method as set forth in claim 1, wherein the third thinned part and the fourth thinned part are formed by press-forging.

11. The manufacturing method as set forth in claim 2, wherein the third thinned part and the fourth thinned part are formed by cutting.

12. The manufacturing method as set forth in claim 2, wherein the third thinned part and the fourth thinned part are formed by grinding.

* * * * *